Nov. 21, 1933.  T. EFSTATHIOU  1,935,838
SIGNALING APPARATUS
Filed Oct. 10, 1931   2 Sheets-Sheet 1

THEOFANIS EFSTATHIOU
INVENTOR

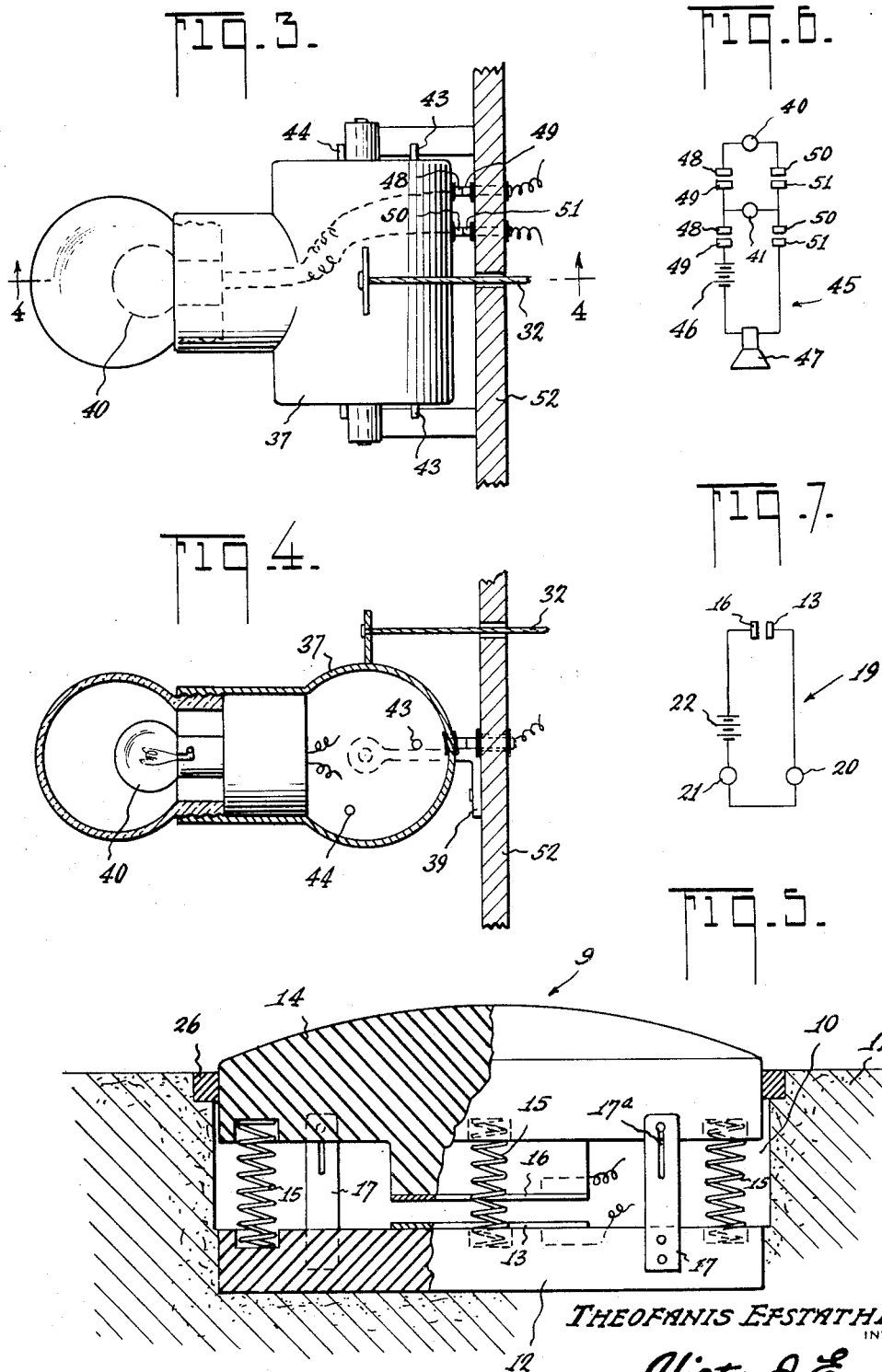

Patented Nov. 21, 1933

1,935,838

UNITED STATES PATENT OFFICE 1,935,838

SIGNALING APPARATUS

Theofanis Efstathiou, New York, N. Y.

Application October 10, 1931. Serial No. 568,004

2 Claims. (Cl. 177—339)

This invention relates to signaling apparatus.

This invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Fig. 3 is an enlarged plan view of a signaling device employed on the automobile shown in Figs. 1 and 2.

Fig. 4 is a section taken approximately on the line 4—4 of Fig. 3 looking in the direction of the arrows.

Fig. 5 is an elevational view, partly in section, of a switch set in a roadway.

Fig. 6 is a diagram of electrical apparatus employed on the automobile shown in Figs. 1 and 2; and Fig. 7 is a diagram of electrical apparatus employed in the signaling system of my invention.

Figure 1:
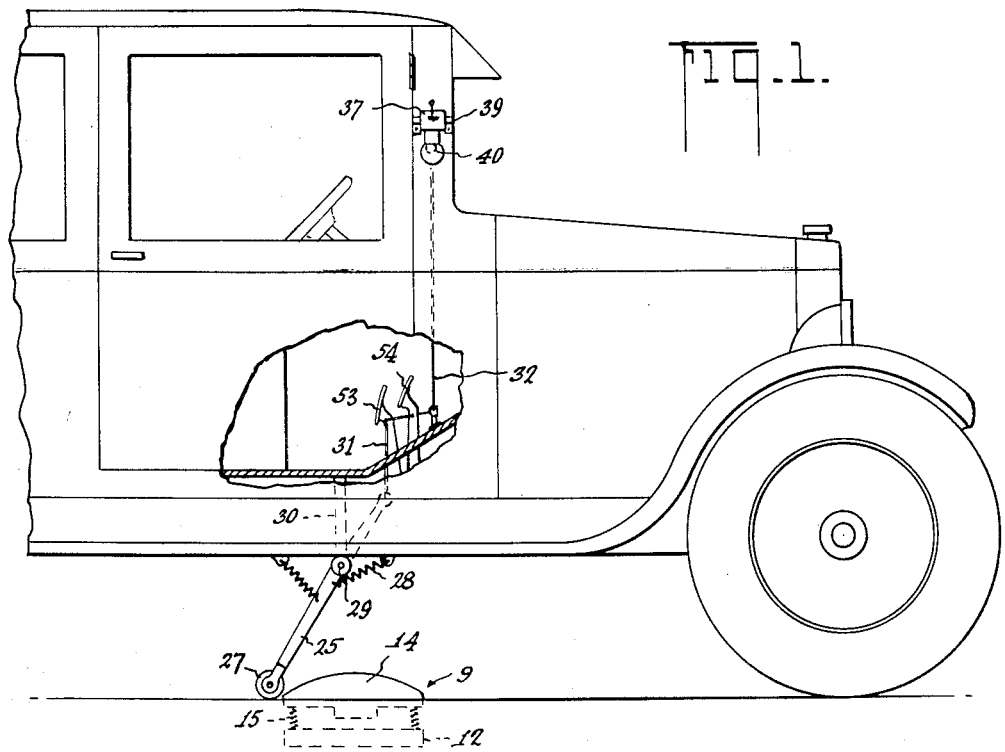
Fig. 1 is a fragmentary, side elevation, partly broken away and partly in section, of an automobile equipped with apparatus of my invention and about to act on a switch placed in a roadway.

Referring to the drawings for a more detailed description thereof, the numeral 9 indicates a switch placed in a roadway, the lower part of said switch being below the surface of the roadway. This switch is placed at or near a road intersection and may be of any desired dimensions. The details of the switch 9 are best shown in Fig. 5. The switch is disposed in a hole 10 in a roadway 11 and comprises a base plate 12 carrying a contactor 13 and includes a curved plate 14 resiliently mounted on helical springs 15. Depending from the lower surface of the resiliently mounted curved plate 14 is a contactor 16 disposed opposite the contactor 13. The plates 12 and 14 are connected by vertical pieces 17, which are provided with slots 17a to allow movement of the upper plate 14 to and from the lower plate 12.

The plates 12 and 14 may be of insulating material, such as rubber for example, so that the contactors 13 and 16 are insulated, these contactors being connected in an electrical circuit 19 shown in Fig. 7. The circuit 19 includes signaling devices 20 and 21, which may be mounted on posts at diagonal corners of a road intersection. An automobile, the wheels of which run over the plate 14, is effective to depress the same so that the contactors 13 and 16 meet to close the circuit 19. The mentioned circuit includes a source of electrical energy 22, as shown in Fig. 7, so that when the circuit is closed by the depression of the plate 14 the signals 20 and 21 will be actuated to warn drivers coming towards the intersection on another road that the automobile causing the actuation of the signals is not going to stop at the intersection.

According to my invention the plate 14 may also be depressed by means of a lever 25 secured to the automobile and depending therefrom. The lever 25 is effective to depress the plate 14 when wheels of the car do not run over the plate, which plate, as shown in Fig. 5, is surrounded by a gasket 26 at the surface of the roadway.

The lower end of the lever 25 carries a roller 27 which contacts with the plate 14. Movement of the car over the mentioned plate is effective to move the lever 25 against the action of a helical spring 28, secured to the lever and to the chassis of the car. Said lever is pivotally mounted at 29 on a bracket 30 fastened to the car. The upper end of the mentioned lever is secured to a rope or chain 31 and this rope or chain is secured at its upper end to a rope or chain 32, as clearly shown in Fig. 2. The rope or chain 32 is rove on pulleys 33, 34, 35 and 36, and is connected at its ends to pivoted casings 37 and 38, mounted on the sides of the car. The casings 37 and 38 are pivotally mounted in brackets 39 fastened to the sides of the car. The casings 37 and 38, respectively, carry electric lamps 40 and 41, which are shown in Figs. 1 and 2 as being in the depending position, in which position they are not lighted.

Figure 2:
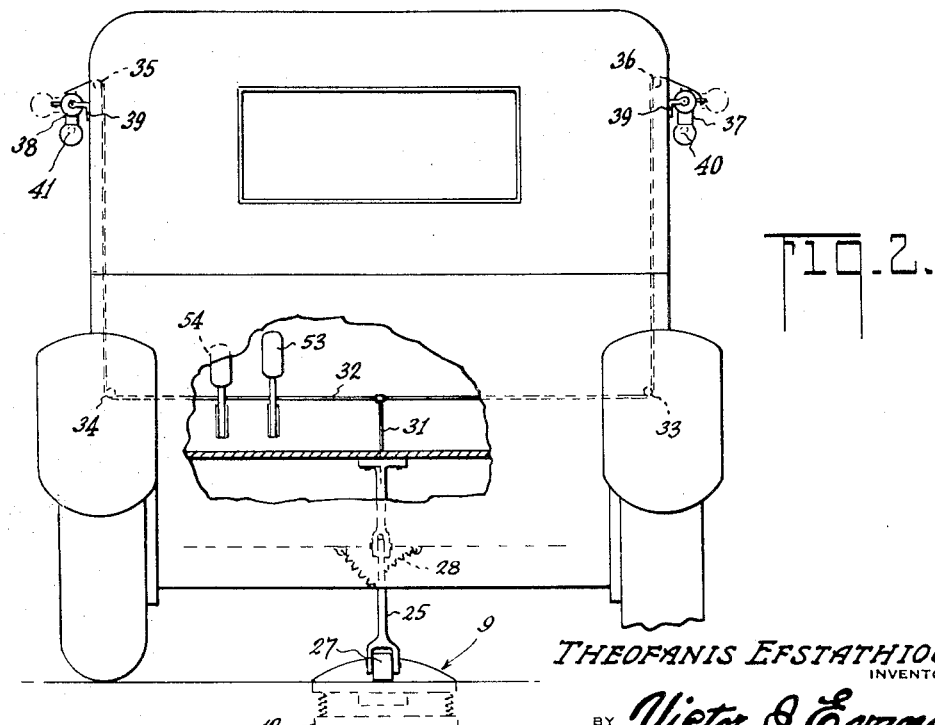
Fig. 2 is a rear view, partly broken away and partly in section, of the automobile shown in Fig. 1.

From the foregoing description it is apparent that a car running in the direction shown in Fig. 1 will have the lever 25 moved to the left by the plate 14 of the switch 9, which movement of the lever is effective to pull down on the rope or chain 31, this movement of the rope or chain 31 being effective to raise the pivoted casings 37 and 38 to a horizontal position, as shown in Figs. 3 and 4. Stops 43 and 44 are provided on the casings 37 and 38 to limit the movements of these casings, the mentioned stops being adapted to abut against their respective brackets 39. The lamps 40 and 41 are connected into an electrical circuit 45, as shown in Fig. 6. Circuit 45 includes the source of electrical energy 46 and horn or siren 47, as well as contactors 48, 49, 50 and 51. The contactors 49 and 51, as shown in Fig. 3, are stationary, being fixed to the side 52 of the automobile, while the contactors 48 and 50 are mounted on the casings 37 and 38, there being a pair of contactors 48 and 50 for each of the casings 37 and 38. When the mentioned casings are moved by the rope or chain 32 from a depending to a horizontal position, the movable contactors 48 and 50 respectively, touch the stationary contactors 49 and 51 to close the circuit 45 to light the lamps 40 and 41 and actuate the horn or siren 47, thereby to give a signal to other drivers.

The flexible cable 32 passes through apertures in the brake pedal 53 and the clutch pedal 54 so that the lamps 40 and 41 may be lighted, at will, by pressing upon either of the mentioned pedals.

The switch 9 is susceptible of being mounted in a wall pocket or in a ceiling pocket, in the latter being especially applicable for use in subways or tunnels for steam or electric trains, where a protruding member from a car or locomotive may engage it to close signaling operating circuits.

What is claimed as new and useful is:

1. In combination, a signal of fixed locality, a self-opening switch set in a roadway and adapted to be closed by an automobile, a circuit in which said signal and switch are included, the automobile including a depending pivoted member for contacting and closing said switch, a movable signal carried by the automobile and means connecting the depending pivoted member and the movable signal and adapted to move the latter to signaling position when said pivoted member closes said switch.

2. In combination, a signal of fixed locality, a self-opening switch set in a roadway and adapted to be closed by an automobile, a circuit in which said signal and switch are included, the automobile including a depending pivoted member for contacting and closing said switch, a movable signal carried by the automobile and means connecting the depending pivoted member and the movable signal and adapted to move the latter to signaling position when said pivoted member closes said switch, said depending member including a roller at its lower end.

THEOFANIS EFSTATHIOU.